(12) United States Patent
Kanevsky et al.

(10) Patent No.: US 6,537,072 B2
(45) Date of Patent: Mar. 25, 2003

(54) SYSTEM AND METHOD FOR TEACHING JOB SKILLS TO INDIVIDUALS VIA A NETWORK

(75) Inventors: Dimitri Kanevsky, Ossining, NY (US); Peter G. Fairweather, Yorktown Heights, NY (US); Sara H. Basson, White Plains, NY (US)

(73) Assignee: IBM, Armonk, NY (US)

( * ) Notice: Subject to any disclaimer, the term of this patent is extended or adjusted under 35 U.S.C. 154(b) by 0 days.

(21) Appl. No.: 09/847,003

(22) Filed: May 1, 2001

(65) Prior Publication Data

US 2002/0164565 A1 Nov. 7, 2002

(51) Int. Cl.[7] .......................... G09B 19/00; G09B 21/00
(52) U.S. Cl. ....................................... 434/219; 434/112
(58) Field of Search ................................ 434/219, 112, 434/118

(56) References Cited

U.S. PATENT DOCUMENTS

| | | | | |
|---|---|---|---|---|
| 5,387,104 A | * | 2/1995 | Corder ........................ | 345/700 |
| 6,157,808 A | * | 12/2000 | Hollingsworth ............. | 434/219 |
| 6,213,780 B1 | * | 4/2001 | Ho et al. ..................... | 434/118 |
| 2001/0034630 A1 | * | 10/2001 | Mayer et al. .................. | 705/7 |

OTHER PUBLICATIONS

Long et al., "Real-time network training meets business demands", Oct. 1999, Computer Dealer News, p. 29.*

* cited by examiner

*Primary Examiner*—John Edmund Rovnak
(74) *Attorney, Agent, or Firm*—Dilworth & Barrese, LLP

(57) ABSTRACT

A system and method are provided for educating an individual with the skills necessary to perform a new job, as well as providing the individual with practical work experience by providing the individual with work to perform, where the work is capable of being performed by someone having the individual's skill level.

19 Claims, 8 Drawing Sheets

FIG. 7

| JOB NAME (702) | FIELD (704) | CATEGORY (706) | COMPLEXITY (708) | BACKGROUND (710) | TIME/AWARD (712) |
|---|---|---|---|---|---|
| WEB PAGE DESIGN | INTERNET TECHNOLOGY | WEB BUILDING HTML XML | (1-100) 20 | SOFTWARE DEVELOPMENT | 6 MONTHS $10,000.00 |
| REPAIR ELECTRICITY IN HOUSE | HOME IMPROVEMENT | REPAIR | (1-100) 10 | LICENSED ELECTRICIAN | 1 DAY $100.00 |
| ... | ... | ... | ... | ... | ... |

FIG. 8

| NAME OF TASK (800) | TOOLS (802) | COMPLEXITY (804) | TIME (806) | COST (808) |
|---|---|---|---|---|
| WEB BUILDING | HTML XML | (1-100) 20 | 6 MONTHS | $1,000.00 |
| ... | ... | ... | ... | ... |

SYSTEM AND METHOD FOR TEACHING JOB SKILLS TO INDIVIDUALS VIA A NETWORK

FIELD OF THE INVENTION

The invention generally relates to the field of improving job skills of individuals through an improved work offering system for individuals. Specifically, the invention relates to a system and method for using a network, such as the Internet, to educate individuals to perform certain types of work and to employ individuals to perform the tasks in which the difficulty of the tasks is based on a skill level of the individual.

BACKGROUND OF THE INVENTION

One problem often encountered by individuals embarking on a new career or job, is the need to learn new job skills necessary for excelling in the new career or job. For example, an individual who wishes to become a computer programmer needs to learn how to program. The learning process may take years before the individual becomes proficient at this task. If the individual is presently involved in a career, has a family to support, or has other responsibilities or commitments, it may be nearly impossible for the individual to quit or cut down on his current line of work to train for the new career or job. Even if the individual is willing to sacrifice some time spent on his current commitments and learn the tasks of the new career or job, the individual's lack of work experience will make it difficult to find a new job even after the individual has learned the tasks of the new career or job. This is a common scenario that generally keeps individuals from embarking on new career fields.

There are however, different web sites that assist individuals in finding new jobs. Some of these web sites even offer jobs that will only last for a short time period or are relatively simple. For example, there may be a web site that will hire a programmer to write a program that may only take a couple of hours. There are also many educational sites on the Internet that provide individuals with the opportunity to study and learn skills over the Internet. Aside from this type of learning on the Internet being a tedious process, this will not suffice to assist the individual in doing even the smallest task requested over the Internet if the individual does not have enough experience doing that type of work.

Accordingly, there exists a need for a system and method for educating an individual with the skills necessary to perform a new job, as well as providing the individual with practical work experience by providing the individual with work to perform, where the work is capable of being performed by someone having the individual's skill level.

SUMMARY

An object of the present invention is to provide a system and method for educating an individual with the skills necessary to perform a new job, as well as providing the individual with practical work experience by providing the individual with work to perform, where the work is capable of being performed by someone having the individual's skill level.

It is another object of the present invention to provide a system and method for providing skills required for performing a job to an individual having a physical and/or mental handicap.

Accordingly, in an embodiment of the present invention, a method is provided for educating an individual with skills necessary to complete a job and for providing the individual with practical work experience by providing the individual with work to perform related to the job. The method includes the steps of receiving the job to be completed from a job provider over a network; separating the job to be completed into a plurality of tasks; receiving a job request from the individual over a network; and matching the individual with at least one of the plurality of tasks and an education process for educating the individual with skills necessary for completing the at least one of the plurality of tasks. Accordingly, the individual can perform the at least one of the plurality of tasks while simultaneously or non-simultaneously being educated with the skills necessary for completing the at least one of the plurality of tasks.

The method further includes the step of evaluating the individual's performance while performing the at least one of the plurality of tasks.

Further, the method includes the step of categorizing the individual from whom the job request is received from. The step of categorizing the individual from whom the job request is received from comprises the step of determining a skill level of the individual corresponding to the at least one of the plurality of tasks.

The method further includes the step of categorizing the plurality of tasks. This step includes the steps of identifying a job field for each of the plurality of tasks; assigning at least one tool for performing each of the plurality of tasks; and determining a complexity rating for each of the plurality of tasks.

The step of matching the individual with at least one of the plurality of tasks and an education process for educating the individual with skills necessary on completing the at least one of the plurality of tasks includes the steps of searching a data base storing the plurality of tasks; selecting the at least one of the plurality of tasks matching the job request; determining a skill and/or knowledge level of the individual and a skill and/or knowledge level required for performing the at least one of the plurality of tasks; providing the at least one of the plurality of tasks to the individual if the skill and/or knowledge level of the individual matches the skill and/or knowledge level required for performing the at least one of the plurality of tasks; and providing the education process to the individual if the skill and/or knowledge level of the individual does not match the skill and/or knowledge level required for performing the at least one of the plurality of tasks.

The step of providing the at least one of the plurality of tasks to the individual includes the step of providing a contract to the individual setting forth the terms of performing the at least one of the plurality of tasks and obligations of the individual and the job provider.

In another embodiment of the present invention, a system is provided for providing a task to a learning user and an education process. The system includes a job center for receiving a plurality of tasks that need to be completed from a plurality of job providers, separating the received tasks into a plurality of job tasks, and providing the learning user with the education process for completing at least one of the plurality of job tasks; a disability center for providing the learning user with at least one tool for completing the at least one of the plurality of job tasks if the learning user has a disability; and at least one user interface for accessing the job and disability centers.

With the system of the present invention, the learning user can perform the at least one of the plurality of job tasks while simultaneously or non-simultaneously being educated with skills necessary for completing the at least one of the plurality of job tasks.

BRIEF DESCRIPTION OF THE FIGURES

The above and other objects, features and advantages of the present invention will become more apparent from the following detailed description when taken in conjunction with the accompanying drawings, in which:

FIG. 7 illustrates a typical screen as viewed by an individual utilizing the job data base of the job center as illustrated in FIG. 2;

FIG. 8 illustrates a typical screen as viewed by an individual utilizing the learning tools data base of the job center as illustrated in FIG. 2.

DETAILED DESCRIPTION OF THE INVENTION

A preferred embodiment of the present invention will be described herein below with reference to the accompanying drawings. In the following description, well know functions or constructions are not described in detail since they would obscure the invention in unnecessary detail.

Figure 1:
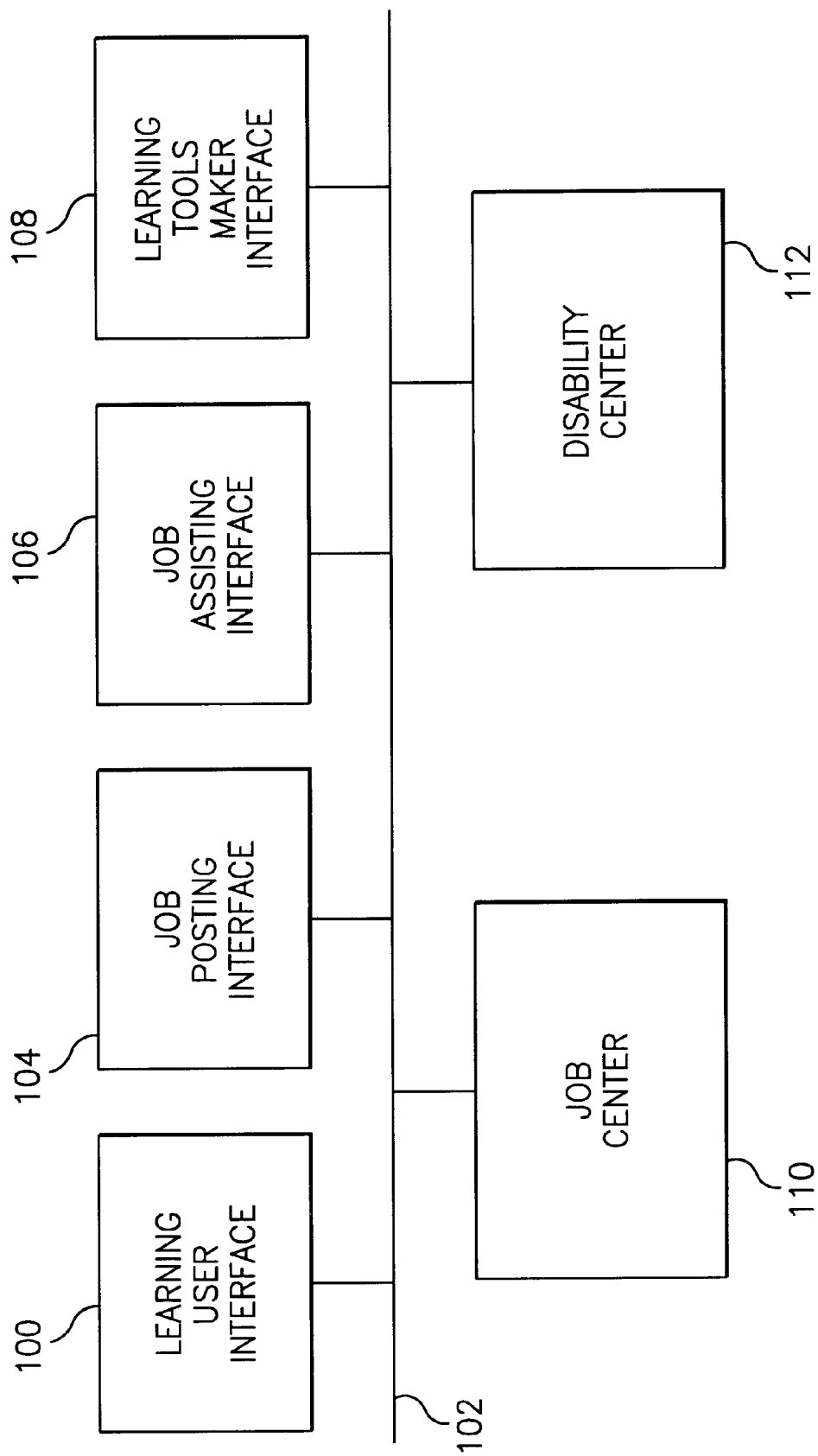
FIG. 1 illustrates a block diagram of a preferred embodiment of the system for educating an individual with the skills necessary to perform a new job, as well as simultaneously providing the individual with practical work experience by providing the individual with work to perform, according to the present invention.

FIG. 1 illustrates a block diagram of a work offering system for providing a job to a learning user that offers an advancing education process and incremental job tasks according to the present invention. The primary components of the system are a learning user interface 100; a network 102, such as the Internet; a job posting interface 104; a job assistance interface 106; a learning tools maker interface 108; a job center 110; and a disability center 112.

The network 102 is connected to the job center 110. The job center 110 is capable of receiving job offers, classifying the jobs of the received job offers, separate the jobs into levels of difficulty, producing educational material necessary to train a learning user to complete each job, and distributing the jobs to new and old students.

The system is preferably designed to be used by four types of individuals. The four types of individuals are the learning users, i.e., individuals who learn how to complete a job and do so for payment; the job posters, i.e., individuals who need a job completed and place an order for the job to be completed to the job center 110; the job assistants, i.e., individuals who help the learning users learn the skills or understand certain elements necessary to complete a job; and the learning tool makers, i.e., individuals who create new tools to assist the learning user in completing a job, and for communicating with the job center 110 via the network 102 through the learning user interface 100, the job posting interface 104, the job assisting interface 106, and the learning tools maker interface 108. A more detailed description of the job center 110 will be discussed herein below with reference to FIG. 2.

The learning user interface 100 is used by the learning user to access the job center 110 and the disability center 112 as described below. The job posting interface 104 is used by an individual, computer network, etc. for accessing the job center 110 in order to post a job. The job assisting interface 106 is used by an individual, computer network, etc. for accessing the job center 110 and the disability center 112 for providing assistance to the learning user as described below. The learning tools maker interface 108 is used to access a learning tools maker as described below for acquiring learning tools.

The disability center 112 provides learning users having various physical and/or mental handicaps with the necessary learning tools to understand and complete the jobs depending on the learning users' special needs. The disability center 112 is connected through the network 102 to the job center 110. The disability center 112 provides all the information necessary to adjust jobs, tasks, offers, and educational material to the learning users having the various handicaps. For example, learning users who have learning disabilities are provided with special educational tools and teaching assistants which allow the learning users to acquire the new skills.

Also, a special evaluation system is provided within the disability center 112 for evaluating how well the disabled learning users acquired new skills (for example, if the learning users have problems with multiple choice questions, than a different examining system is suggested). The disability center 112 also provides means to represent learning material and job tasks in a form that the learning users having handicaps could access them. For example, a screen reader for blind individuals or a transcription for individuals who are hearing impaired, etc.

Figure 2:
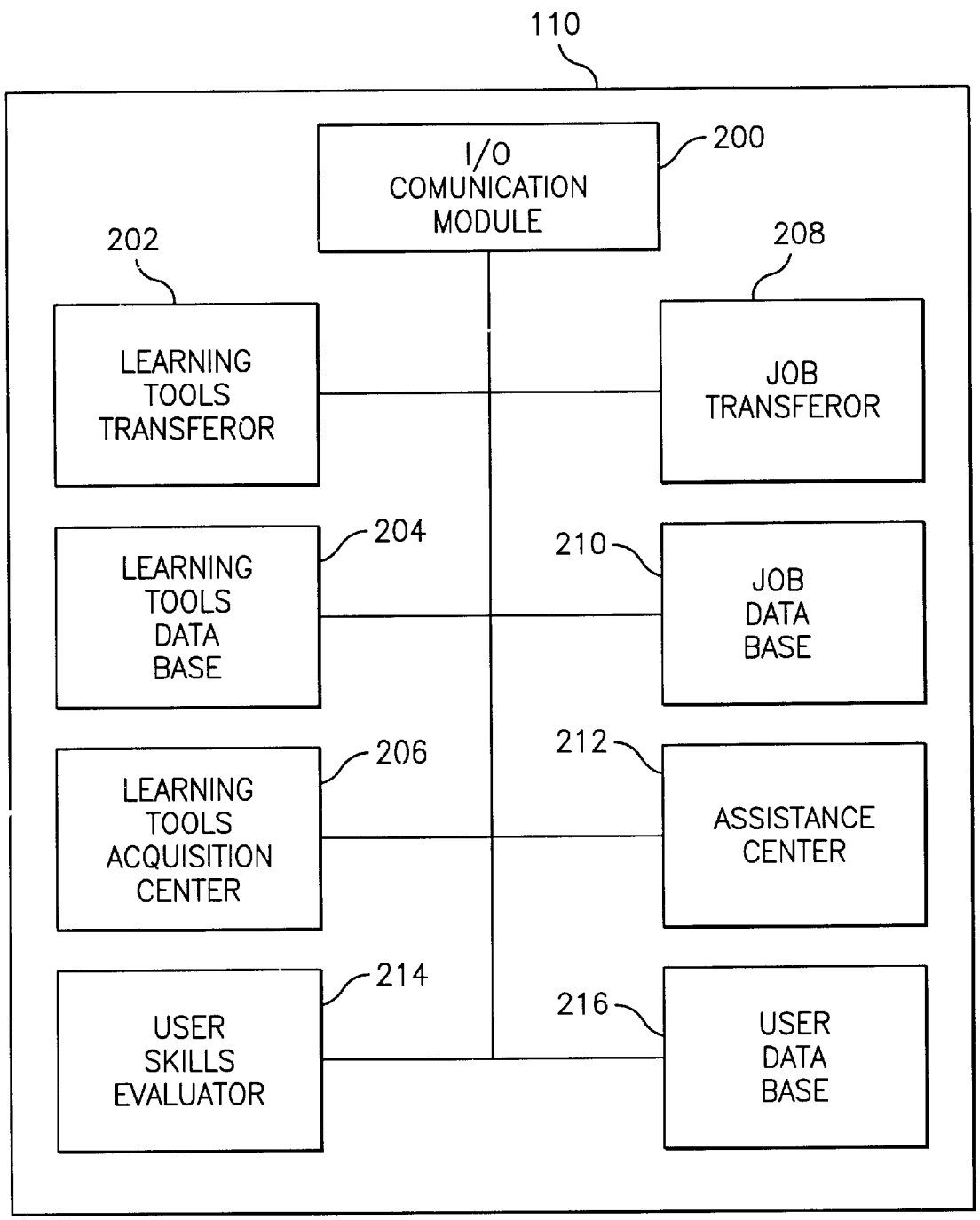
FIG. 2 illustrates a block diagram of the job center as illustrated in FIG. 1.

FIG. 2 illustrates the job center 110 which includes an I/O communication module 200, a learning tools transferor 202, a learning tools data base 204, a learning tools acquisition center 206, a job transferor 208, a job data base 210, an assistance center 212, a user skills evaluator 214, and a user data base 216. The I/O communication module 200 communicates via the network 102 with all the components of FIG. 1. When a job is received by the I/0 communication module 200 from the job posting interface 104, the job transferor 208 classifies the new job and places it in the job data base 210 until it is selected by a learning user to be completed. The job transferor 208 will be described in more detail herein below with respect to FIG. 3.

When a learning user selects a job from the job data base 210, the learning tools transferor 202 assigns learning tools to the job task selected by the learning user from the learning tools data base 204. If the necessary tools are not in the learning tools data base 204, the learning tools acquisition center 206 acquires the necessary tools from a learning tools maker via the learning tools maker interface 108. Both the learning tools transferor 202 and the learning tools acquisition center 206 will be described in greater detail herein below with respect to FIG. 4 and FIG. 6 respectively.

The user skills evaluator 214 classifies the skill levels of the learning users and the job assistants and places this information in the user data base 216. These classified skills levels are then used to match up learning users with appropriate job assistants in the assistance center 212. The assistance center 212 will be described in more detail herein below with respect to FIG. 5.

Figure 3:
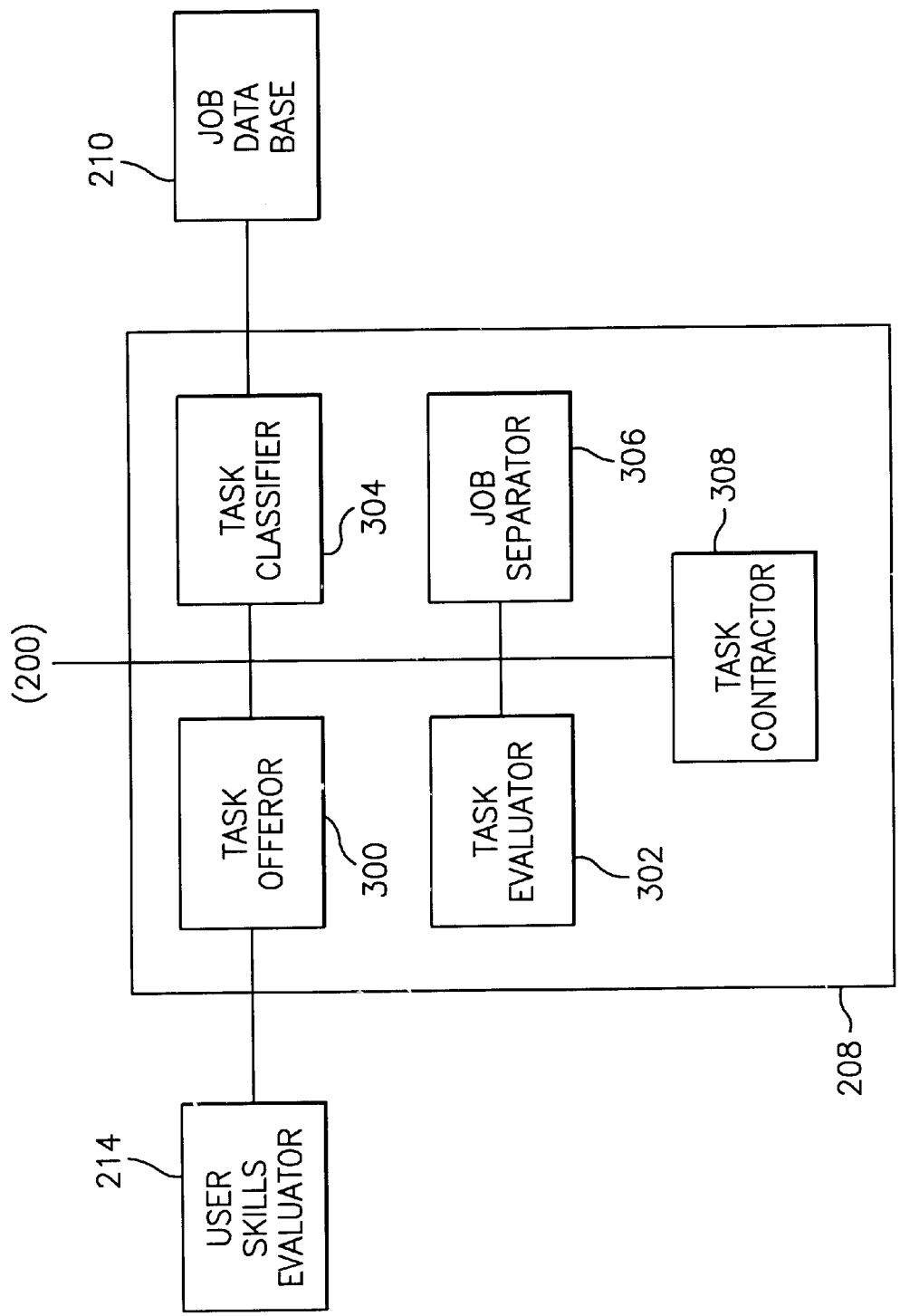
FIG. 3 illustrates a block diagram of the job transferor as illustrated in FIG. 2.

FIG. 3 is a block diagram illustrating the job transferor 208 of the job center 110. When a newly posted job is received by the job center 110 it is sent to the job transferor 208. Once there, the job separator 306 breaks the posted job into smaller tasks to be completed. These smaller tasks are sent to the task classifier 304 where tasks are classified by type of work, difficulty, experience necessary to complete, and time needed to complete. The task classifier 304 classifies the tasks manually, i.e., an individual reads the tasks as they appear on a screen of the task classifier 302 and classifies the tasks according to the various classification types, such as type of work, difficulty, experience necessary to complete, time needed to complete, etc.

The tasks can also be classified automatically by the task classifier 304. In such a case, the task classifier 304 is provided with a software program having conventional classification modules designed to classify the tasks. For example, the software program preferably can use a fixed vocabulary of attributes or XML, as known in the art, to classify the tasks. After being classified, the smaller tasks are sent to the job data base 210 until the tasks are selected to be completed by a learning user logging onto the job center 110 via the learning user interface 100.

When a learning user requests a certain type of job, the task offeror 300 searches the job data base 210 for possible matches to the learning user's request. When there is a job match, the task offeror 300 checks the information from the user skills evaluator 214 in the user data base 216 and determines if the learning user has the requisite skills to complete the matching job by being able to complete each or most of the smaller tasks which are stored within the job data base 210 and which correspond to the matching job.

If the learning user does have the requisite skills to complete the tasks or is able to learn the requisite skills in a predetermined allotted time, then the task contractor 308 creates a contract between the learning user and the job poster for the completion of the job task(s). The job contract sets forth all the terms for completing the task(s) as well as the guidelines for compensation upon completion. When the task(s) is completed by the learning user, the completed task(s) is then evaluated by the task evaluator 302 and compared with the job contract to evaluate if the task(s) was completed according to the terms of the job contract.

Figure 4:
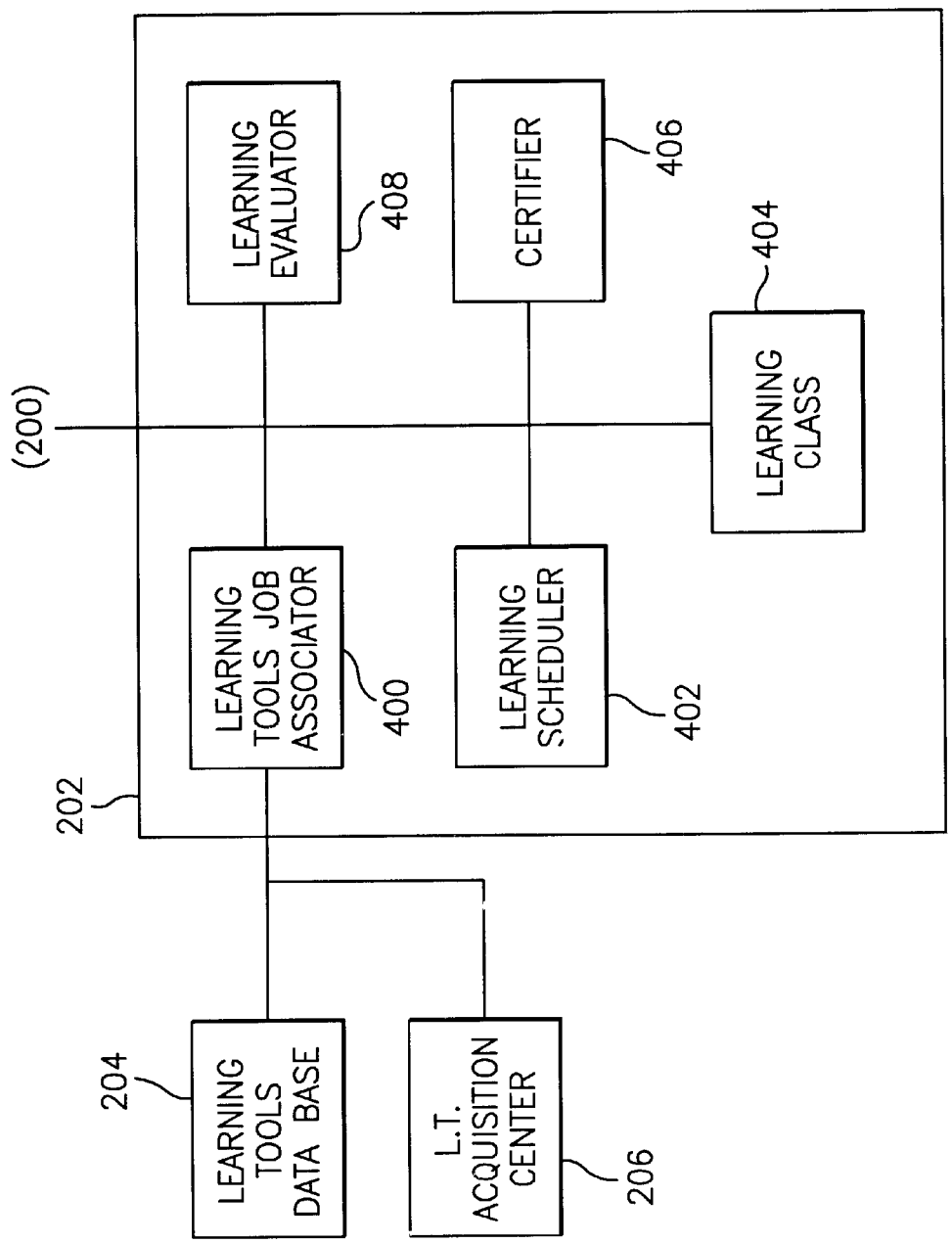
FIG. 4 illustrates a block diagram of the learning tools transferor as illustrated in FIG. 2.

FIG. 4 is a block diagram illustrating the learning tools transferor 202 of the job center 110. When a learning user selects and receives a new job task(s) to be completed, the task(s) is sent to the learning tools job associator 400. The learning tools job associator 400 determines what tools are necessary to complete the task(s) by examining the learning user's skill level and the classification of the task. After determining the necessary tools, the learning tools job associator 400 searches the learning tools data base 204 for the necessary tools. If these tools are not in the data base 204, the learning tools job associator 400 contacts the learning tools acquisition center 206 to acquire these tools.

Once the learning user has all the necessary tools to complete the task(s), the learning scheduler 402 creates a learning schedule for the learning user to learn how to use these tools to complete the task(s) in the required or suggested time. The learning class 404 provides instructions to the learning user in completing the task(s) using the learning tools.

After the task(s) is completed, the learning evaluator 408 evaluates how well the learning user has learned to complete the task(s) using the learning tools. The certifier 406 certifies the user, if it is determined that the user has obtained requisite knowledge from the learning tools and updates this information in the user data base 216. For example, the certifier 406 certifies the user, if the user received an evaluation rating above a predetermined threshold by the learning evaluator 408.

Figure 5:
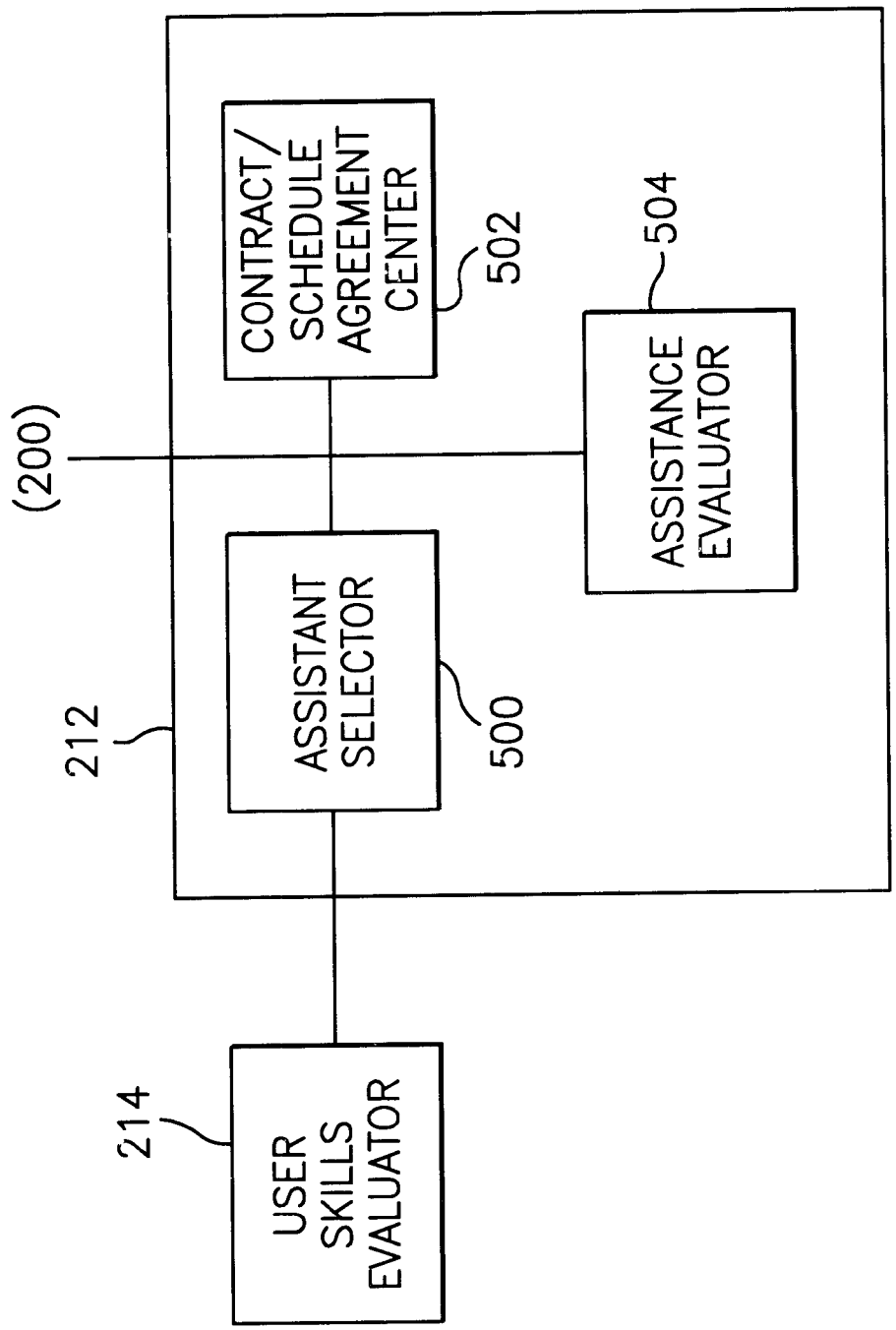
FIG. 5 illustrates a block diagram of the assistance center as illustrated in FIG. 2.

FIG. 5 is a block diagram illustrating the assistance center 212 of the job center 110. The assistance center 212 includes an assistant selector 500; acontract/schedule agreement center 502; and an assistance evaluator 504 for providing assistance to a learning user in learning a new skill and completing a new task. The assistant selector 500 matches the job assistant with the learning user by examining the type of task(s) to be completed, the learning user's skill level and the job assistant's skill level. The assistant selector 500 gets the skill level information of the learning user and the job assistant from the information of the user skills evaluator 214 in the user data base 216.

The assistant selector 500 also determines, based on the learning user's skill level and/or knowledge, a learning process or education process which would be most helpful to the learning user in completing the task(s). The education process is then provided to the learning user for enabling the learning user to learn the required skills and other information for completing the task(s). The education process can be, for example, a series of presentations outlining a preferred method for completing the task(s) following by a test. The education process can be stored within the assistant selector 500 or can be imported via the network.

The contract/schedule agreement center 502 sets a schedule and creates a contract setting forth the terms of the agreement between the job assistant and the learning user. After the task(s) is completed, the assistance evaluator 504 evaluates the assistance given to the learning user by the job assistant and determines how much and how well the assistant aided the learning user in the completion of the task(s).

Figure 6:
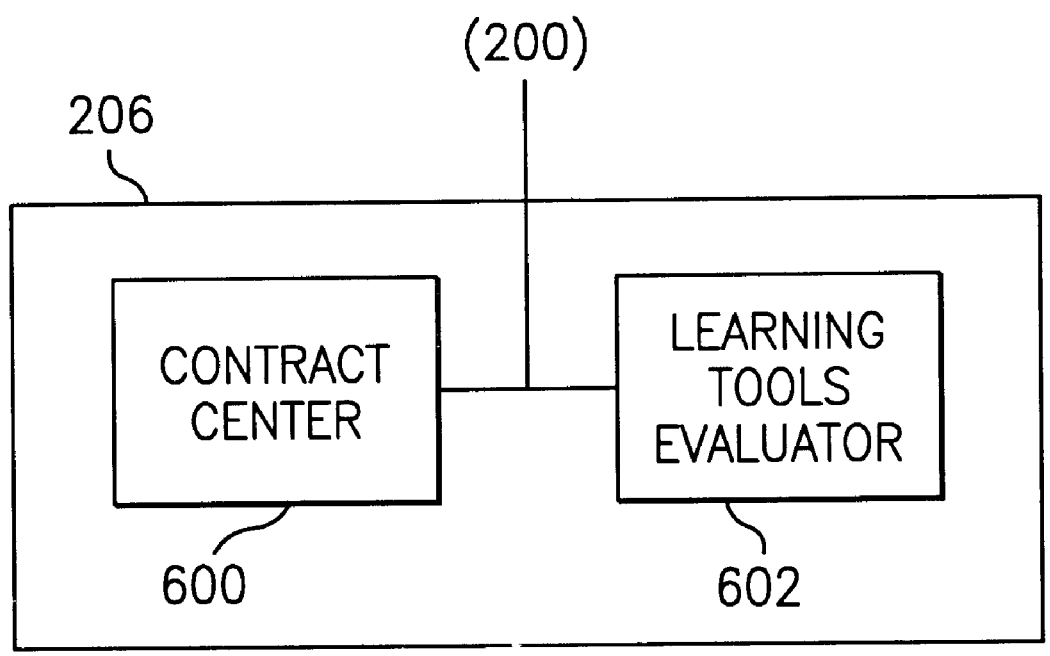
FIG. 6 illustrates a block diagram of the learning tools acquisition center as illustrated in FIG. 2.

FIG. 6 is a block diagram illustrating the learning tools acquisition center 206. When the learning tools transferor 202 cannot find a necessary tool in the learning tools data base 204, it contacts the learning tools acquisition center 206 to acquire the necessary tool. The learning tools acquisition center 206 includes a contract center 600 that contracts with a learning tool maker via learning tools maker interface 108 to make a new learning tool and sets the terms of the contract between the learning tools maker and a system operator. The learning tools evaluator 602 evaluates the performance of the new learning tool and checks to determine if the new learning tool meets the specification of the contract.

FIG. 7 illustrates a preferred screen of the job database 200. Column 702 contains the names of the jobs that need completion and column 704 gives a general description of what career field the job is categorized in. For example, a job titled "web page design" in column 702 is categorized under the career field of "Internet Technology" in column 704.

Column 706 is more specific categorization of the field of the particular job. To continue the last example, the "web page design" job may further be categorized by "web building, HTML, or XML" in column 706. Column 708 contains the difficulty of the particular job; column 710 contains the background requirements that a user must have in order to complete the job; and column 712 states the time period for completion and the compensation.

Continuing with the previous example, in column 708, a scale of 1–100 may be used where 1 is the most basic of web page designs and 100 is the most difficult. According to column 710, the background needed is that of a software developer and according to column 712 the job will take 6 months to complete and pay $10,000.

FIG. 8 illustrates a preferred screen of the learning tools database 204. Column 800 contains the type of job a particular learning tool was designed to assist in and column 802 lists the type of learning tool. Column 804 contains a rating of the complexity of learning the learning tool. This rating can be a number rating system, such as 1–100, or a letter rating system, such as A–F. Columns 806 and 808 note the time frame for learning the learning tool and the cost of the training, respectively.

Figure 9:
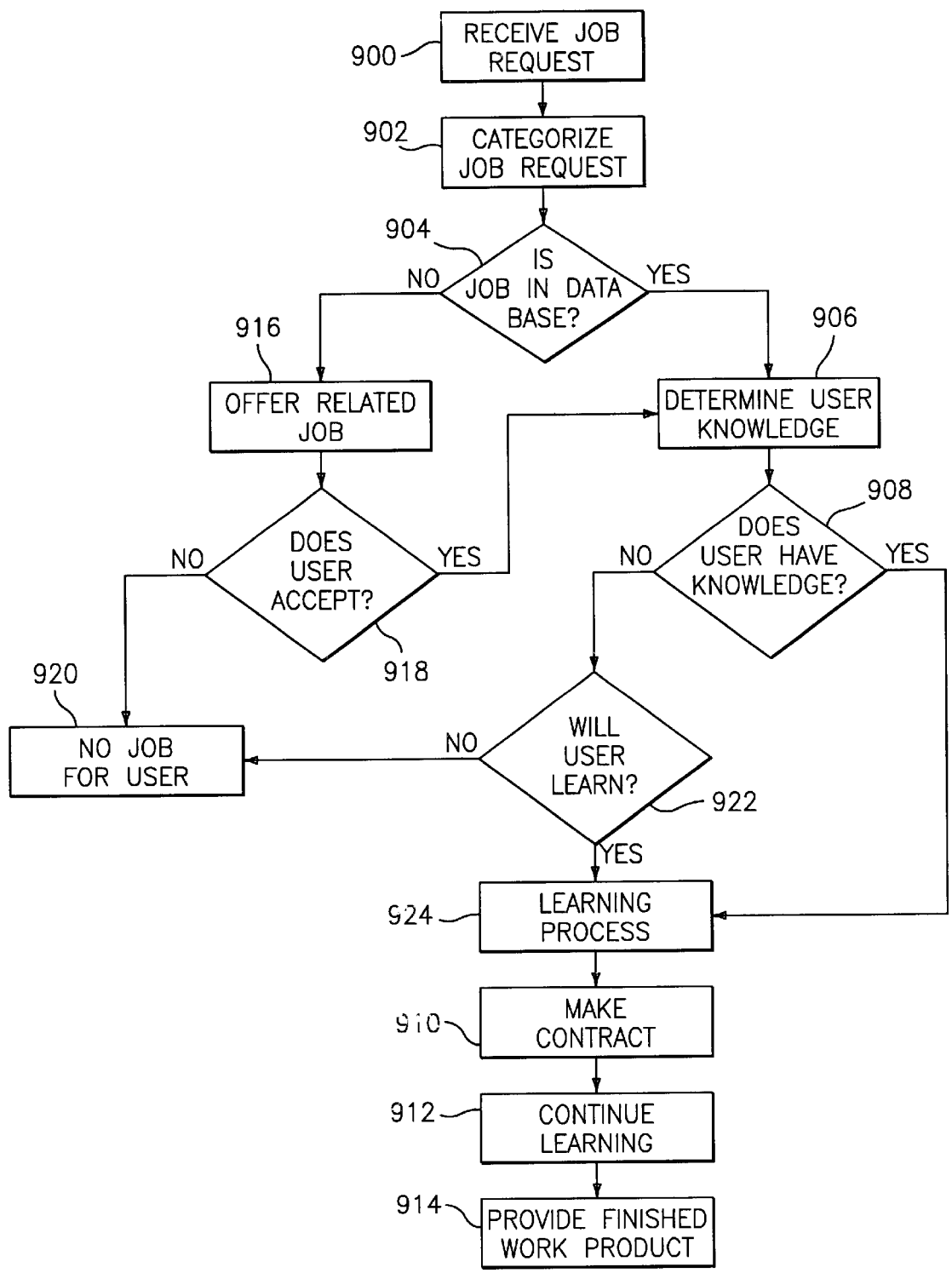
FIG. 9 is a flow chart illustrating a method for educating an individual with the skills necessary to perform a new job, as well as simultaneously providing the individual with practical work experience by providing the individual with work to perform, according to a preferred embodiment of the present invention.

FIG. 9 illustrates a flow chart of an exemplary method according to the principles of the present invention. At step 900, the job center 110 receives a request from several users requesting jobs. Step 902 categorizes all of the job requests and step 904 determines if these type of job openings exist in the data base 210. If yes, step 906 categorizes the user's knowledge and/or skill level and step 908 checks to see if the user has the required skills and/or knowledge for performing the job. Step 908 determines if the user has the required skills and/or knowledge by comparing the user's skill and/or knowledge level with a predetermined skill and/or knowledge level required for performing the job. If the user has the required skills and/or knowledge, a contract is created and the user is provided with the job in step 910. Step 912 teaches the user how to perform the requested job. For example, by teaching the user how to perform each task necessary for the completion of the job. Accordingly, the user performs the requested job and provides a finished work product in step 914.

If step 908 determines that the user does not have the required skills and/or knowledge, step 922 determines whether the user is willing to learn the new skills. If yes, then in step 924 the learning process or education process is initiated and the user is taught the new skills. The process then proceeds to step 910 where the user is provided with the job upon successfully completing the education process. If the user is not willing to learn the new skills, the process proceeds to step 920 where it is determined that there is no current job for the user.

It is contemplated that the user is simultaneously provided with the job and the learning process, such that the user can perform the job while completing the learning process.

If step 904 determines that there is no job in the job data base 210 that matches the request by the user, a job in a closely related field is offered to the user in step 916. If the user accepts the closely related job, the process proceeds to step 906. If the user does not, the process proceeds to step 920 where it is determined that there is no current job for the user.

One skilled in the art would appreciate that a set of programmable instructions executed by a processor of the system are required for performing the process steps of the inventive system and method described above. For example, programmable instructions are required in order for the job center 110 and the disability center 112 to perform the various procedures described above, such as for the disability center 112 to be able to evaluate how well the disabled learning users acquired new skills. One skilled in the art can also appreciate that the system of the present invention can be designed such that the functions of the various components of the system can be performed by other components of the system. For example, the education process can be selected by a component other than the assistant sector 500.

While the invention has shown and described with reference to a certain preferred embodiment thereof, it will be understood by those skilled in the art that various changes in form and details may be made without departing from the spirit and scope of the invention as defined by the appended claims.

What is claimed:

1. A method for educating an individual with skills necessary to complete a job and for providing the individual with practical work experience by providing the individual with work to perform related to the job, the method comprising the steps of:

receiving the job to be completed from a job provider over a network;

separating the job to be completed into a plurality of tasks;

receiving a job request from the individual over a network;

matching the individual with at least one of the plurality of tasks and an education process for educating the individual with skills necessary on completing the at least one of the plurality of tasks; and evaluating the individual's performance while performing the at least one of the plurality of tasks.

2. The method of claim 1, further comprising the step of categorizing the individual from whom the job request is received from.

3. The method of claim 2, wherein the step of categorizing the individual from whom the job request is received from comprises the step of determining a skill level of the individual corresponding to the at least one of the plurality of tasks.

4. The method of claim 1, further comprising the step of categorizing the plurality of tasks.

5. The method of claim 4, wherein the step of categorizing the plurality of tasks comprises the steps of:

identifying a job field for each of the plurality of tasks;

assigning at least one tool for performing each of the plurality of tasks; and determining a complexity rating for each of the plurality of tasks.

6. The method of claim 1, wherein the step of matching the individual with at least one of the plurality of tasks and an education process for educating the individual with skills necessary on completing the at least one of the plurality of tasks comprises the steps of:

searching a data base storing the plurality of tasks;

selecting the at least one of the plurality of tasks matching the job request;

determining a skill and/or knowledge level of the individual and a skill and/or knowledge level required for performing the at least one of the plurality of tasks;

providing the at least one of the plurality of tasks to the individual if the skill and/or knowledge level of the individual matches the skill and/or knowledge level required for performing the at least one of the plurality of tasks; and providing the education process to the individual if the skill and/or knowledge level of the individual does not match the skill and/or knowledge level required for performing the at least one of the plurality of tasks.

7. A method for educating an individual with skills necessary to complete a job and for providing the individual with practical work experience by providing the individual with work to perform related to the job, the method comprising the steps of:

receiving the job to be completed from a job provider over a network;

separating the job to be completed into a plurality of tasks;

receiving a job request from the individual over a network;

matching the individual with at least one of the plurality of tasks and an education process for educating the individual with skills necessary on completing the at least one of the plurality of tasks; and providing a contract to the individual setting forth one or more terms of performing the at least one of the plurality of tasks and obligations of the individual and the job provider.

8. A work offering system for providing a task to a learning user and an education process, comprising:

a job center for receiving a plurality of tasks that need to be completed from a plurality of job providers, separating the received tasks into a plurality of job tasks, providing the learning user with the education process for completing at least one of the plurality of job tasks, and providing a contract setting forth instruction terms between the job assisting user and the learning user;

a disability center for providing the learning user with at least one tool for completing the at least one of the plurality of job tasks if the learning user has a disability; and at least one user interface for accessing the job and disability centers.

9. The work offering system of claim 8, wherein the job center comprises:

an Input/Output (I/O) Communication Module for communication with the learning user via the at least one user interface;

a Job Data Base for storing the plurality of job tasks;

a Job Transferor Module for separating the receiving task into the plurality of job tasks, categorizing the plurality of job tasks, and providing the at least one of the plurality of job tasks to the learning user;

a User Skills Evaluator Module for evaluating skills of the learning user;

a Learning Tools Data Base for storing a plurality of tools for performing job tasks;

a Learning Tools Acquisition Module for acquiring at least one tool via a network for performing job tasks when the at least one tool is not stored within the Learning Tools Data Base;

a Learning Tools Transferor Module for providing at least one tool to the learning user, where the provided at least one tool is selected from the group consisting of the acquired at least one tool and the plurality of tools stored within the Learning Tools Data Base;

an Assistance Module for selecting the education process, according to the evaluated skills of the learning user by the User Skills Evaluator Module, for assisting the learning user in completing the at least one of the plurality of job tasks; and a User Data Base for storing information corresponding to the learning user, including skill evaluation information provided by the User Skills Evaluator.

10. The work offering system of claim 9, wherein the Job Transferor Module comprises:

a Job Separator Module for separating the plurality of tasks to be completed into the plurality of job tasks;

a Task Classifier Module for categorizing each of the plurality of job tasks by job field, determining a skill level required to complete each of the plurality of job tasks, and determining an experience level required to complete each of the plurality of job tasks;

a Task Offeror Module for providing the at least one of the plurality of job tasks to the learning user;

a Task Contractor Module for creating a contract setting forth employment terms between the learning user and a job provider of the plurality of job providers; and a Task Evaluator Module for evaluating the performance of learning user in performing the at least one of the plurality of job tasks according to the employment terms between the learning user and the job provider.

11. The work offering system of claim 9, wherein the Learning Tools Transferor Module comprises:

a Learning Tools Job Associator Module for determining the at least one tool required for completing the at least one of the plurality of job tasks;

a Learning Scheduler Module for providing a schedule to the learning user indicating an amount of time for learning the at least one tool determined by the Learning Tools Job Associator Module;

a Learning Class Module for providing instructions to the learning user in completing the at least one of the plurality of job tasks using the at least one tool;

a Learning Evaluator Module for evaluating the learning process of the learning user in completing the at least one of the plurality of job tasks using the at least one tool; and a Certifier Module for certifying the learning user, if the learning user received an evaluation rating about a predetermined threshold by the Learning Evaluator Module.

12. A work offering system for providing a task to a learning user and an education process, comprising:

a job center for receiving a plurality of tasks that need to be completed from a plurality of job providers, separating the received tasks into a plurality of job tasks, and providing the learning user with the education process for completing at least one of the plurality of job tasks;

a disability center for providing the learning user with at least one tool for completing the at least one of the plurality of job tasks if the learning user has a disability; and at least one user interface for accessing the job and disability centers, wherein the job center comprises:

an Input/Output (I/O) Communication Module for communication with the learning user via the at least one user interface;

a Job Data Base for storing the plurality of job tasks;

a Job Transferor Module for separating the receiving task into the plurality of job tasks, categorizing the plurality of job tasks, and providing the at least one of the plurality of job tasks to the learning user;

a User Skills Evaluator Module for evaluating skills of the learning user;

a Learning Tools Data Base for storing a plurality of tools for performing job tasks;

a Learning Tools Acquisition Module for acquiring at least one tool via a network for performing job tasks when the at least one tool is not stored within the Learning Tools Data Base;

a Learning Tools Transferor Module for providing at least one tool to the learning user, where the provided at least on e tool is selected from the group consisting of the acquired at least one tool and the plurality of tools stored within the Learning Tools Data Base;

an Assistance Module for selecting the education process, according to the evaluated skills of the learning user by the User Skills Evaluator Module, for assisting the learning user in completing the at least one of the plurality of job tasks; and a User Data Base for storing information corresponding to the learning user, including skill evaluation information provided by the User Skills Evaluator, and the Assistance Module comprises:

an Assistant Selector Module for selecting one of a job assisting user from the User Data Base having skills and knowledge to assist the learning user in completing the at least one of the plurality of job tasks;

a Contract/Schedule Agreement Module for providing a contract setting forth instruction terms between the job assisting user and the learning user; and an Assistance Evaluator Module for evaluating the performance of the job assisting user in assisting the learning user in completing the at least one of the plurality of job tasks.

13. A work offering system for providing a task to a learning user and an education process, comprising:

a job center for receiving a plurality of tasks that need to be completed from a plurality of job providers, separating the received tasks into a plurality of job tasks, and providing the learning user with the education process for completing at least one of the plurality of job tasks;

a disability center for providing the learning user with at least one tool for completing the at least one of the plurality of job tasks if the learning user has a disability; and at least one user interface for accessing the job and disability centers, wherein the job center comprises:

an Input/Output (i/O) Communication Module for communication with the learning user via the at least one user interface;

a Job Data Base for storing the plurality of job tasks;

a Job Transferor Module for separating the receiving task into the plurality of job tasks, categorizing the plurality of job tasks, and providing the at least one of the plurality of job tasks to the learning user;

a User Skills Evaluator Module for evaluating skills of the learning user;

a Learning Tools Data Base for storing a plurality of tools for performing job tasks;

a Learning Tools Acquisition Module for acquiring at least one tool via a network for performing job tasks when the at least one tool is not stored within the Learning Tools Data Base;

a Learning Tools Transferor Module for providing at least one tool to the learning user, where the provided at least one tool is selected from the group consisting of the acquired at least one tool and the plurality of tools stored within the Learning Tools Data Base;

an Assistance Module for selecting the education process, according to the evaluated skills of the learning user by the User Skills Evaluator Module, for assisting the learning user in completing the at least one of the plurality of job tasks; and a User Data Base for storing information corresponding to the learning user, including skill evaluation information provided by the User Skills Evaluator, and the Learning Tools Acquisition Module comprises:

a Contract Module for providing a contract setting forth terms regarding the creation of a tool which is not stored within the Learning Tools Data Base between a learning tools maker and a system operator; and a Learning Tools Evaluator for evaluating the tool created by the learning tools maker.

14. A system for educating an individual with skills necessary to complete a job and for providing the individual with practical work experience by providing the individual with work to perform related to the job, the system comprises:

means for receiving the job to be completed from a job provider over a network;

means for separating the job to be completed into a plurality of tasks;

means for receiving a job request from the individual over a network;

means for matching the individual with at least one of the plurality of tasks and an education process for educating the individual with skills necessary on completing the at least one of the plurality of tasks; and means for evaluating performance of the individual while performing the at least one of the plurality of tasks.

15. The system of claim 14, further comprising means for evaluating the individual's performance while performing the at least one of the plurality of tasks.

16. The system of claim 14, further comprising means for categorizing the plurality of tasks.

17. The system of claim 16, wherein the means for categorizing the plurality of tasks comprises:

means for identifying a job field for each of the plurality of tasks;

means for assigning at least one tool for performing each of the plurality of tasks; and means for determining a complexity rating for each of the plurality of tasks.

18. The system of claim 14, wherein the means for matching the individual with at least one of the plurality of tasks and an education process for educating the individual with skills necessary on completing the at least one of the plurality of tasks comprises:

means for searching a data base storing the plurality of tasks;

means for selecting the at least one of the plurality of tasks matching the job request;

means for determining a skill and/or knowledge level of the individual and a skill and/or knowledge level required for performing the at least one of the plurality of tasks;

means for providing the at least one of the plurality of tasks to the individual if the skill and/or knowledge level of the individual matches the skill and/or knowledge level required for performing the at least one of the plurality of tasks; and means for providing the education process to the individual if the skill and/or knowledge level of the individual does not match the skill and/or knowledge level required for performing the at least one of the plurality of tasks.

19. A system for educating an individual with skills necessary to complete a job and for providing the individual with practical work experience by providing the individual with work to perform related to the job, the system comprises:

means for receiving the job to be completed from a job provider over a network;

means for separating the job to be completed into a plurality of tasks;

means for receiving a job request from the individual over a network; and means for matching the individual with at least one of the plurality of tasks and an education process for educating the individual with skills necessary on completing the at least one of the plurality of tasks, and for providing a contract to the individual setting forth one or more terms of performing the at least one of the plurality of tasks and obligations of the individual and the job provider.

* * * * *